Figure 1:
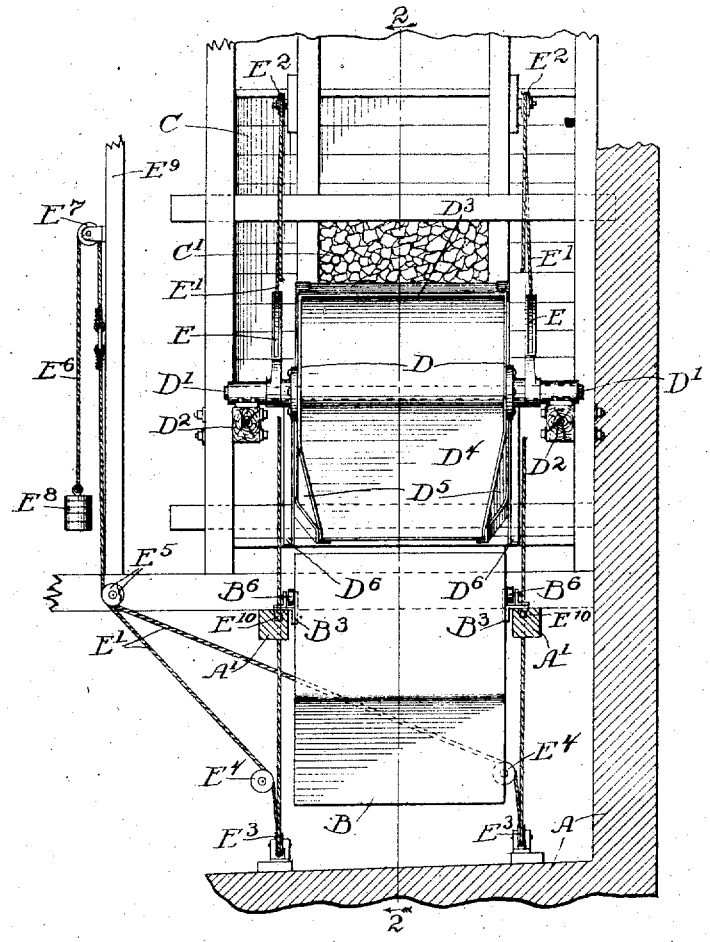

E. E. BARRETT.

LOADING AND UNLOADING APPARATUS.

APPLICATION FILED JUNE 4, 1909.

Reissued Dec. 28, 1909.

13,061.

2 SHEETS—SHEET 1.

Witnesses:
Frank D. Blanchard
Sophie B. Werner

Inventor
Edward E. Barrett
By Parker & Carter
Attorneys.

E. E. BARRETT.
LOADING AND UNLOADING APPARATUS.
APPLICATION FILED JUNE 4, 1909.
Reissued Dec. 28, 1909.
13,061.
2 SHEETS—SHEET 2.
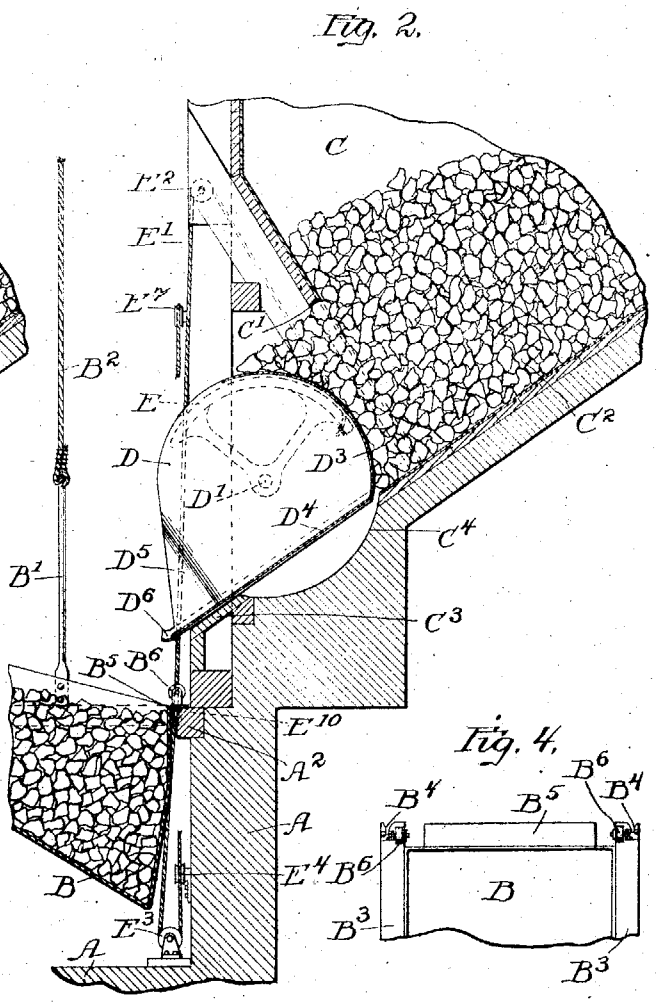
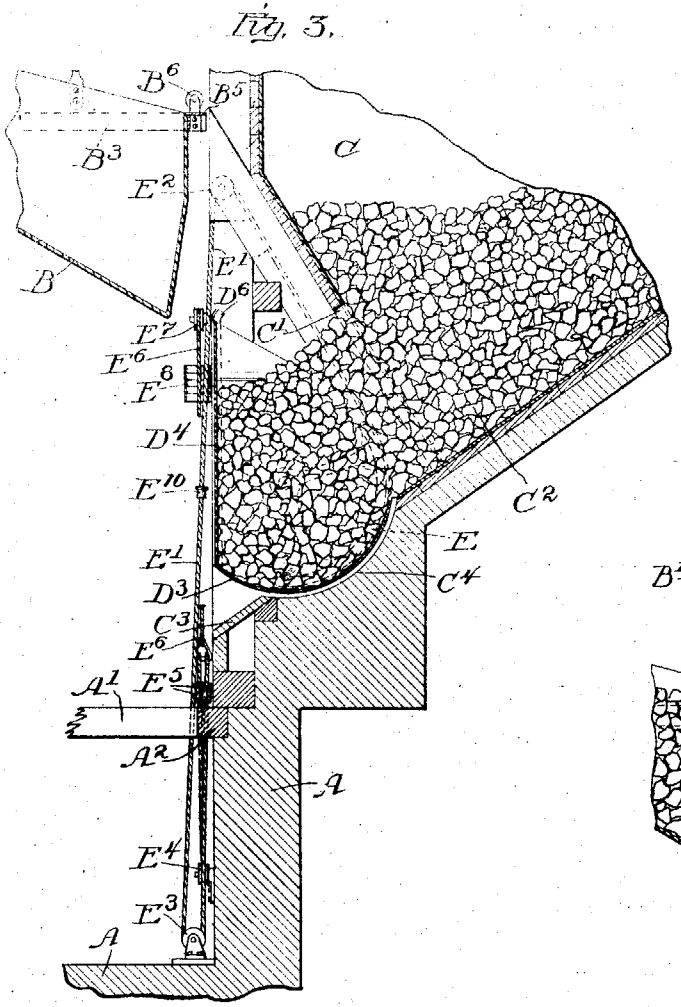
Witnesses:
Frank A. Blanchard
Sophie B. Werner
Inventor:
Edward E. Barrett
By Parker & Carter
Attorneys.

UNITED STATES PATENT OFFICE.

EDWARD E. BARRETT, OF LA GRANGE, ILLINOIS.

LOADING AND UNLOADING APPARATUS.

13,061. Specification of Reissued Letters Patent. Reissued Dec. 28, 1909.

Original No. 899,095, dated September 22, 1908, Serial No. 398,172. Application for reissue filed June 4, 1909. Serial No. 500,229.

*To all whom it may concern:*

Be it known that I, EDWARD E. BARRETT, a citizen of the United States, residing at La Grange, in the county of Cook and State of Illinois, have invented certain new and useful Improvements in Loading and Unloading Apparatus, of which the following is a full, clear, and exact specification.

My invention relates to loading and unloading apparatus.

It is illustrated in the accompanying drawings wherein—

Figure 1 is a front elevation, Fig. 2, a vertical section on the line 2—2 of Fig. 1, Fig. 3, a vertical section on the same line with the parts shown in elevated position, and Fig. 4 is a detail plan view of a portion of the hoisting bucket.

Like parts are indicated by the same letter in all the figures.

A illustrates the side and bottom of a frame associated with a coal handling apparatus.

B is a bucket having a bail $B^1$ and connected with the hoisting rope $B^2$. The bucket is adapted to lift successively a series of charges of coal from a lower storage hopper C to an upper receiving hopper not shown. Laterally projecting from the bucket are two angle bars $B^3$ $B^3$ adapted each at its forward end to rest upon a cross piece $A^1$ and slotted each at $B^4$. On the rear end of the bucket is a similar angle bar $B^5$ adapted also to rest on the cross beam $A^2$ when the bucket is in its lowest position. On the projecting ends of the angle bars $B^3$ $B^3$ are mounted guide rollers $B^6$ $B^6$.

The hopper C is shaped in any desired manner but is provided with a free opening $C^1$ through which the material or coal $C^2$ may escape. In front of this opening is placed the gate which consists of the sides D D mounted on the shaft $D^1$ which is suitably supported in bearings on the frame pieces $D^2$ $D^2$. The gate is completed by the curved portion $D^3$ which serves alternately as a stop for the opening $C^1$ and as the bottom of the gate bucket, and the flat portion $D^4$ which serves alternately as the forward part of the bucket and as the chute whereby the bucket gate discharges its load. The sides of the gate bucket are inwardly turned at $D^5$ $D^5$ to narrow the discharge opening. The hopper C is provided with the forwardly projecting lower portion $C^3$ which is curved downwardly at $C^4$ to permit the curved portion $D^3$ of the gate bucket to rotate. The bottom $D^4$ and the sides D D and the side portions $D^5$ $D^5$ of the gate bucket project beyond the radius on which the curved portion $D^3$ is struck, so as when in the position shown in Fig. 2 to project into the pathway of the bucket B. The side rails $D^6$ $D^6$ are associated with the bottom of the gate bucket as shown.

On the axis of rotation of the gate bucket and connected therewith are mounted two grooved segments E E and to each is secured a rope $E^1$ $E^1$. Each of these ropes passes upwardly over the idler $E^2$ which is mounted on the frame which supports the hopper C, thence the rope passes outwardly through the slot $B^4$ around the idler $E^3$ at the bottom of the shaft in which the bucket B travels, thence each rope passes upwardly over an idler $E^4$ and a second idler $E^5$ above which they are secured together and to the end of the rope $E^6$ which passes over the idler $E^7$ and has at its farther extremity a balance weight $E^8$. The idler $E^7$ is mounted on the standard $E^9$. On each of the ropes $E^1$ is a button $E^{10}$ in the path of the projecting end of the angle bar $B^3$.

The use and operation of my invention are as follows: As the parts are shown in Figs. 1 and 2 they are at rest, the bucket gate acting as a gate and the hoisting bucket filled ready to be lifted. If now the hoisting mechanism begins to operate, the hoisting bucket B will rise from its position of rest and the two rollers $B^6$ $B^6$ will engage the underside of the bars $D^6$ $D^6$ and as the hoisting bucket travels upwardly the gate bucket will be rotated on its axis until the parts will have assumed the position shown in Fig. 3 and the bucket gate will be filled with coal and the hoisting bucket will be traveling upwardly in its shaft. As the gate bucket thus rotates, it raises the weight $E^8$ which serves as a counterbalance. As the hoisting bucket descends, the slots $B^4$ receive the ropes $E^1$ and in time they engage the buttons $E^{10}$. A further downward motion of the hoisting bucket evidently brings it into the position shown in Fig. 2 which, at the same time, brings the gate bucket into the position shown in Fig. 2 and discharges its measured contents into the bucket B.

Thus the operation continues and the hoisting bucket B receives its load in measured charges so as to avoid spilling from overloading and the load is discharged in such a way as to bridge the interval between the side of the shaft and the hoisting bucket B and thus no spill will take place at that part.

It will be observed that I place intermediate the fixed hopper or supply device and the definite and established path of the hoisting bucket a combined chute, gate and measuring device; that this device in the form shown consists of two plates which are in effect tangential to a circle about the axis on which the gate is mounted; that the chute lies parallel with and just outside the path of movement of the bucket when the device is acting as a gate and projects slightly beyond or into such path when this plate is acting as a chute; that the plate, which acts as a gate when the device is discharging, is placed circumferentially to the axis of rotation and that the device rotates alternately in opposite directions through less than a circle. The plate $D^3$, in performing the function of a gate, rises through the coal from below and therefore operates as an undercut gate.

I claim:

1. In a loading and unloading apparatus, the combination of a hoisting bucket, moving in a definite path with a fixed supply hopper at one side of such path, and intermediate such path and hopper, a pivotally mounted combined gate, measure and chute.

2. In a loading and unloading apparatus, the combination of a hoisting bucket, moving in a definite path with a fixed supply hopper at one side of such path, and intermediate such path and hopper, a pivotally mounted combined gate, measure and chute, said chute member projecting into the path of the bucket when serving as a chute.

3. In a loading and unloading apparatus, the combination of a hoisting bucket, moving in a definite path with a fixed supply hopper at one side of such path, and intermediate such path and hopper, a pivotally mounted combined gate, measure and chute, said chute member lying parallel with and outside of such path when serving as a gate.

4. In a loading and unloading apparatus, the combination of a hoisting bucket, moving in a definite path with a fixed supply hopper at one side of such path, and intermediate such path and hopper, a pivotally mounted combined gate, measure and chute, said chute member tangential to a circle about its axis of rotation.

5. In a loading and unloading apparatus, the combination of a hoisting bucket, moving in a definite path with a fixed supply hopper at one side of such path, and intermediate such path and hopper, a pivotally mounted combined gate, measure and chute, which contains two plates which alternately act as gates and one of them as a chute.

6. In a loading and unloading apparatus, the combination of a hoisting bucket, moving in a definite path with a fixed supply hopper at one side of such path, and intermediate such path and hopper, a pivotally mounted combined gate, measure and chute, which consists of end plates, two plates at an angle to each other, and having an opening between them.

7. In a loading and unloading apparatus, the combination of a hoisting bucket with a fixed hopper supply and intermediate them a pivotally mounted combined gate, measure and chute consisting of end plates and two plates set at an angle to each other, with an opening between them, adapted to alternately act as gates and one of them as a chute.

8. In a loading and unloading apparatus, the combination of a hoisting bucket with a fixed hopper supply and intermediate them a pivotally mounted combined gate, measure and chute comprising end plates, a circumferentially arranged plate, adapted to act as a gate, and a tangentially arranged plate connected therewith and adapted to act alternately as a gate and chute.

9. In a loading and unloading apparatus, the combination of a hoisting bucket moving in a definite path, with a fixed supply hopper at one side of such path, and intermediate such path and hopper a pivotally mounted combined gate and measuring receptacle, and means for simultaneously raising the bucket and rotating the combined gate and measuring receptacle in a given direction and for simultaneously lowering the bucket and rotating the combined gate and measuring receptacle in the opposite direction.

10. In a loading and unloading apparatus, the combination of a hoisting bucket moving in a definite path, with a fixed supply hopper at one side of such path, and intermediate such path and hopper a pivotally mounted combined gate and measuring receptacle, and means for simultaneously raising the bucket and rotating the combined gate and measuring receptacle in a given direction and for simultaneously lowering the bucket and rotating the combined gate and measuring receptacle in the opposite direction, said means containing connections between the bucket and the combined gate and measuring receptacle.

11. In a loading and unloading apparatus, the combination of a hoisting bucket moving in a definite path, with a fixed supply hopper at one side of such path, and intermediate such path and hopper a pivotally mounted combined gate and measuring receptacle, and means for raising and lowering the bucket and simultaneously turning the combined gate and measuring receptacle in opposite directions so as to make it serve as a receiving combined gate and measuring receptacle when the bucket is up and a discharging combined gate and measuring receptacle when the bucket is down.

12. In a loading and unloading apparatus, the combination of a hoisting bucket moving in a definite path with a fixed supply hopper at one side of such path and intermediate such path and hopper, a pivotally mounted combined measuring gate and receptacle provided with an opening which alternately faces toward the hopper and toward the bucket and means responsive to the motion of the bucket for reciprocally rotating said combined gate and measuring receptacle.

13. In a loading and unloading apparatus, the combination of a hoisting bucket moving in a definite path with a fixed supply hopper at one side of such path and intermediate such path and hopper, a pivotally mounted combined gate and measuring receptacle having two walls along one of which the material flows in from the hopper along the other of which it flows out toward the bucket and which alternately act as gates to stop the flow, and means responsive to the motion of the bucket for reciprocally rotating said combined gate and measuring receptacle.

EDWARD E. BARRETT.

Witnesses:
EDNA K. REYNOLDS,
SOPHIE B. WERNER.